April 11, 1961 G. H. ROGERS ET AL 2,979,097
APPARATUS FOR PEELING TOMATOES
Filed Jan. 23, 1956 2 Sheets-Sheet 1
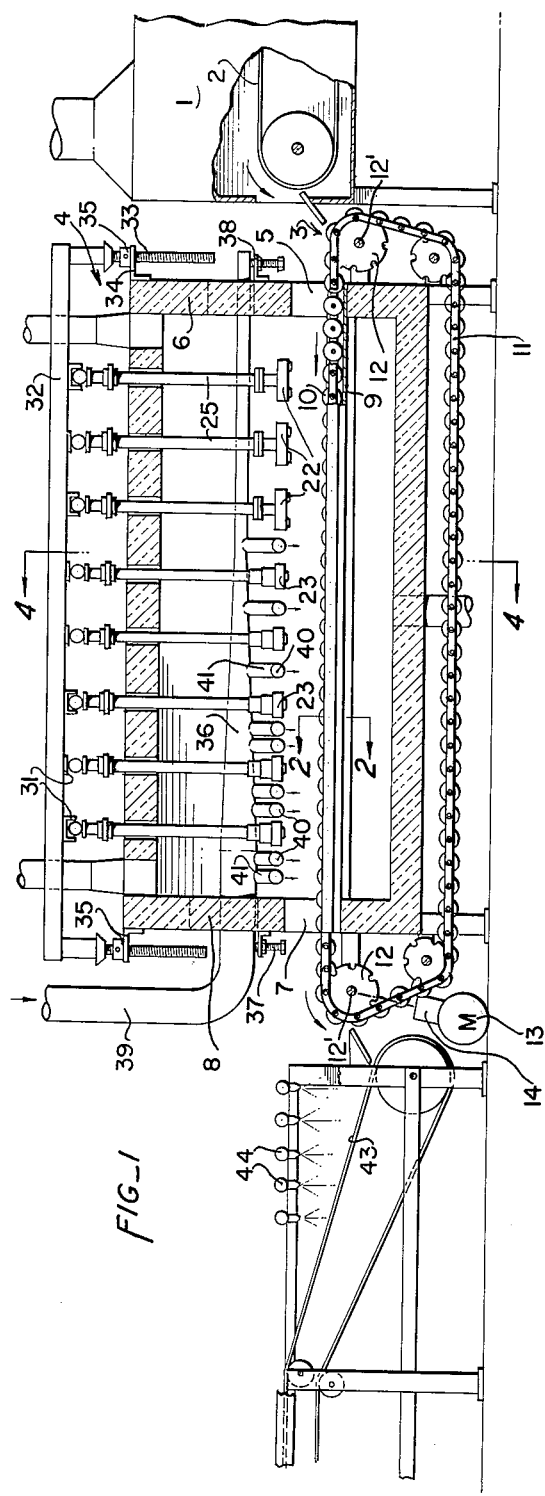
INVENTORS
GRANT H. ROGERS
EDWIN MITCHELL
BY
Boyken, Mohler & Wool
ATTORNEYS April 11, 1961 G. H. ROGERS ET AL 2,979,097
APPARATUS FOR PEELING TOMATOES
Filed Jan. 23, 1956 2 Sheets-Sheet 2
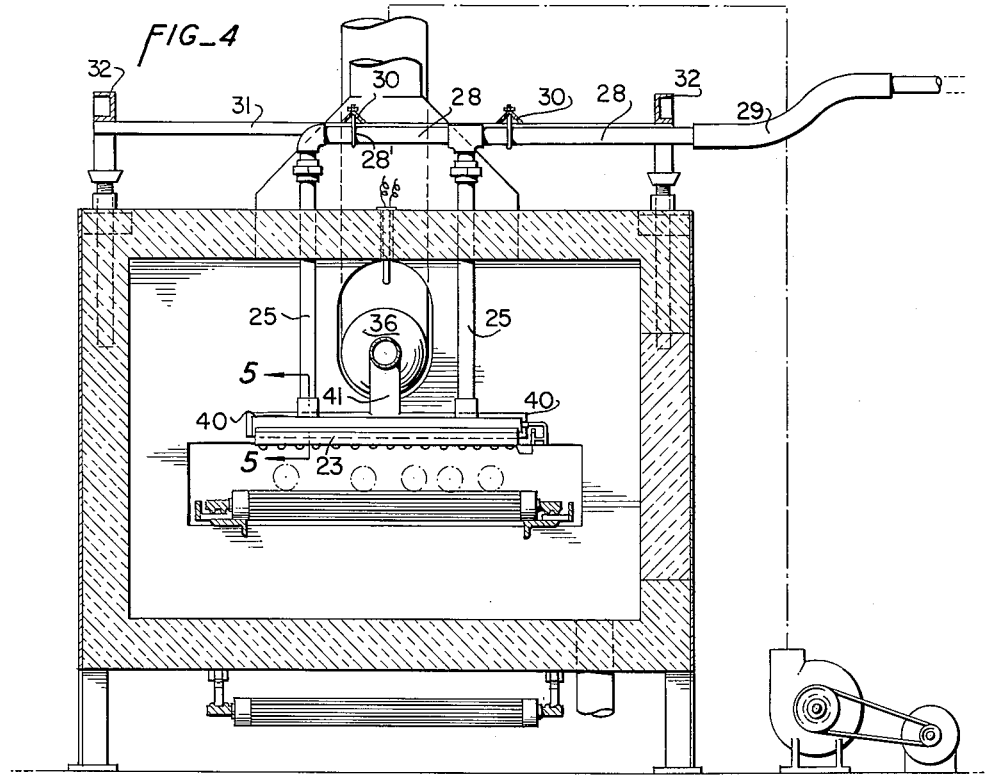
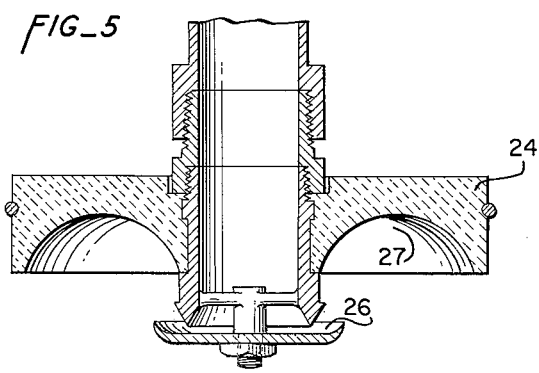
INVENTORS
GRANT H. ROGERS
EDWIN MITCHELL
BY
*Boyken, Mohler & Wood*
ATTORNEYS United States Patent Office 2,979,097
Patented Apr. 11, 1961

2,979,097
APPARATUS FOR PEELING TOMATOES

Grant H. Rogers, Los Gatos, and Edwin L. Mitchell, San Jose, Calif., assignors to Richmond-Chase Company Filed Jan. 23, 1956, Ser. No. 560,663

2 Claims. (Cl. 146—227)

This invention relates to apparatus for peeling tomatoes, and has for one of its objects the provision of an improved method of peeling tomatoes in which the peel or skin is removed from the pulp and the latter is not cooked nor discolored, but instead is more firm and is of better color than where conventional peeling apparatus and method are employed.

Heretofore, the loosening of the peel or skins of tomatoes by the so-called "flame" peeling method requires impingement of the flame on the skin and the skin is charred or carbonized, but it is not removed. Also the pulp below the skin is cooked to an objectionable degree when the impingement of the flame on the skin lasts a sufficient length of time to effect the necessary charring of the skin, which is essential in the flame peeling method. A still further object to this method is the fact that many of the tomatoes will have black specks of carbon adhered to the pulp by the time they reach the canning step, even after washing the tomatoes, with the result that cans of tomatoes having such specks are either condemned or are graded down with resultant loss to the canner.

The most generally practiced conventional method of peeling motatoes is to subject them to steam until the skins are sufficiently loosened to enable workers to manually slip the skins from the pulp. This method has the objection of requiring a great number of workers, which is very costly since each tomato must be manually handled. This method also has the objection that the relatively long time required to loosen the skin necessarily heats the pulp or meat and softens the latter as well as changes its color to a degree. Furthermore, many of the skins do not readily come off and require additional handling to remove the skin.

One of the objects of the present invention is the provision of a method and apparatus for peeling tomatoes and other fruits and vegetables, that does not require lye or acid or the impingement of flame onto the surfaces of the tomatoes, nor does it char the skin or discolor the pulp or cook or soften the latter, and which method and apparatus will result in removing the skin from the bodies of the tomatoes, etc., without requiring manual handling of the latter and without mutilating or bruising the pulp. By this method the number of workers required may be reduced to substantially only those required for inspection purposes since tomatoes that are normal and right for canning and that have been properly cored will have their skins completely removed and require no further manual handling. This elimination of the manual handling step is in itself desirable since ripe tomatoes are relatively delicate and the less they are handled the better.

A still further object of the invention is the provision of a method of peeling tomatoes and the like that is highly effective in completely removing the skins without the necessity for manual handling of the tomatoes, and which method eliminates the objection to methods that char the skin, such as occurs where a flame directly impinges on the skin and where radiant heat only is applied.

Where charring of the skin occurs, it is virtually impossible to prevent some of the charred material from contaminating the tomatoes, yet most of the methods heretofore suggested necessarily result in charring the skin.

Other objects and advantages will appear in the description and in the drawings.

In the drawings, Fig. 1 is a simplified part-sectional and part-side elevational and partially broken away view of apparatus that is suitable for carrying out the present method, some portions being schematic.

Fig. 2 is an enlarged sectional view taken along line 2—2 of Fig. 1.

Fig. 3 is an enlarged sectional view taken along line 3—3 of Fig. 2.

Fig. 4 is a sectional view taken along line 4—4 of Fig. 1.

Fig. 5 is an enlarged sectional view of one of the burners taken along line 5—5 of Fig. 4.

This description will refer specifically to tomatoes, but it is to be understood that the invention is not restricted to tomatoes. It is applicable to any fruit or vegetable in which similar results would be obtained through practicing the method steps herein described and through using the apparatus or the equivalent thereof.

Assuming that the whole, ripe tomatoes are washed and cored in the usual manner, said tomatoes are carried through a conventional steam box 1 on the upper run of an endless conveyor 2. Preferably the tomatoes are in a single layer on the conveyor 2 and through all the steps of the method hereinafter described.

Said upper run of conveyor 2 enters the steam box at one end thereof and passes out of the opposite end (Fig. 1).

Adjacent to said opposite end, the tomatoes are discharged onto the upper run of a special, horizontally extending endless conveyor 3, which upper run carries them through a heating chamber 4 in which substantially all sides of the tomatoes are subjected to radiant heat only, although, as will later be described, they also are impinged by air discharged against them.

The heating chamber 4 has heat insulated walls, one or more of which may be provided with doors and windows so that ready access may be had to the interior of the chamber and so that the conveyor, tomatoes and burners may be readily viewed.

An inlet 5 is provided in one end wall 6 of the heating chamber for entry of the upper run of the conveyor 3, and an outlet 7 may be provided in the end wall 8 opposite to wall 6 for passage of the upper run out of the chamber 4.

Extending between the inlet and outlet in chamber 4 is a pair of horizontally extending tracks 9. These tracks support rollers 10 that, in turn, are connected by chains 11. Chains 11 extend over pairs of opposed sprocket wheels 12 on shafts that, in turn, are journalled for rotation in bearings, and which bearings may be stationary relative to the heating chamber and may be carried by the end walls 6, 8 thereof. A motor 13 may also be connected with the shaft to which one of the pairs of spockets are secured, and any suitable transmission 14 may be between the motor and shaft to control the speed of the conveyor.

Secured to rollers 10 of each opposed pair and extending between them is an annular row of polysided rods 15 (Fig. 3) equally spaced about and parallel with the axis common to each opposed pair of rollers. These rods may be octagonal or hexagonal in cross sectional contour. The latter have been found to be satisfactory.

The use of hexagonal rods is more for the purpose of convenience and economy than of necessity. As seen in Fig. 3 the radially disposed inner halves of the rod do not contact the tomatoes 16. Only the radially disposed outer halves actually engage the tomatoes, so any means providing a contour such as is provided by the outer halves of the rods would be suitable. What is substantially provided by each set of rods is a rotary, elongated, generally cylindrical support, the outer surface of which is longitudinally recessed at 17 with each recess being of substantially V-shape in cross-sectional contour except that the apex is removed to provide a slot 18. Walls or flat surfaces 19 connect the outer edges of adjacent recesses, which walls are generally concentric with the axis of the rollers carrying each set of rods.

The above arrangement provides circumferentially spaced outer peripheral walls 19 having walls or flat surfaces 20 (sides of V-shaped recesses) extending divergently inwardly from the opposite, longitudinally extending edges of each wall 19.

The rollers 10, being equally spaced apart, it follows that the sets of rods 15 are equally spaced apart and as the rollers revolve in the same direction upon the movement of the upper run of the conveyor through the heating chamber in direction from inlet 5 to outlet 7, the sets of rods will revolve in the same direction or so that the upper halves of each set will move generally in the direction of movement of the conveyor. The tomatoes supported on adjacent sets of the rods will be rotated reversely of the direction of rotation of the sets thereof or clockwise if the upper run of the conveyor moves from right to left as seen in Fig. 1.

The result of this type of support for the tomatoes is that they are rotated or tumbled as they are moved through the heating chamber, but the impacts received from the flat sides 20 of the rods is not sufficient to injure the pulp.

Spaced above the upper run of conveyor 3 and within the heating chamber are rows of infra red heating elements or burners. Each of these rows forms a battery of adjacent burners extending transversely of the longitudinal axis of the heating chamber or of the path of travel of conveyor 3 through the heating chamber.

These batteries of burners are in a row that extends over and longitudinally of the conveyor 3.

Preferably, for approximately one-third of the distance between end walls 6, 8 and in the area within the heating chamber adjacent to inlet 5, double burners 22 make up each battery thereof. The burners 23 in the remaining area are shown as being single burners in each battery. Fig. 4 shows the arrangement of the burners in rows extending transversely over the conveyor 3, and Fig. 1 shows the double and single arrangement of the burners in each battery thereof.

It should be stated that, up to the present time, infra red electric heating elements are not suitable for giving the desired results. The burners in the present invention each comprises a body 24 (Fig. 5) of refractory material carried on the lower end of a vertically extending fuel pipe 25 for delivering fuel (preferably gas) to the lower surface of the body 24. This fuel line preferably extends through the center of each body 24 to the lower side thereof, and the fuel is deflected upwardly through an annular aperture 26 into a downwardly opening annular recess 27 that is concentric with aperture 26 and that is formed in the lower side of body 24. The gas, when ignited in recess 27, heats the body 24 to a red glow at which point body 24 emits radiant energy and this radiant energy is absorbed by the tomatoes. There are no flames that impinge the tomatoes since the burners are radiant burners, hence no flame contact with the tomatoes is possible at any distance of the burners from the tomatoes. This is very important inasmuch as any impingement of the flames on the tomatoes would ruin the product.

The batteries of burners are preferably about equally spaced apart in direction longitudinally of the heating chamber.

Each battery of burners may receive gas or fuel from a pair of pipes 25 (Fig. 4) that connect at one of their ends with a pipe 28 that, in turn, is connected by a flexible coupling 29 with a pipe from a source of fuel.

The pipes 25, 28 are carried by a frame for vertical movement with said frame so that the burners may be simultaneously moved upwardly and downwardly or the burners at one end of the row of batteries or the other may be raised and lowered relative to the burners at the other end of said row.

This frame comprises elongated members 30 extending longitudinally of the heating chamber above the latter, which members are connected with pipes 28 by any suitable hanger means, such as U-bolts 28' extending around the pipes with their shanks extending upwardly through the members 30, the said pipes 28 extending transversely of the length of the heating chamber. These members 30 are secured to cross frame pieces 31 that are above the ends of the heating chamber, and said cross frame pieces, in turn, are secured at their ends to side frame members 32 that extend longitudinally of the heating chamber above the side walls of the latter.

Vertical screws 33 are secured at their upper ends to the opposite ends of the side frame members 32, and these screws reciprocably extend downwardly through brackets 34 that are carried by the heating chamber. A nut 35 threaded on each screw is rotatably supported on each bracket 34 so that the weight of the pipe and burner supporting frame will be carried by said brackets. Upon rotating the nuts 35 in one direction or the other the frame will be elevated or lowered, and consequently the burners will be elevated or lowered. Obviously each end of the frame may be elevated or lowered independently of the other. Thus any desired spacing between the burners and the tomatoes may be achieved, and by this means the intensity of the radiant heat striking the tomatoes may be controlled.

Extending through an opening in wall 8 is an air conduit 36. This conduit is adapted to extend longitudinally of the heating chamber through the latter, and means is provided for supporting it at its ends for vertical movement so that it, and any nozzles carried thereby may also be moved to different levels above tomatoes 16 on conveyor 3. Such means may be similar to the means for elevating and lowering the burners, such as a vertical screw 37 below each end of the conduit outside the end walls 6, 8. These screws threadedly extend through brackets 38 carried by said end walls and support the ends of the conduit therein. Upon rotating the screws 37 in one direction or the other, the air conduit may be raised or lowered.

The inlet end of the air conduit is adjacent to and outside the wall 8, which end connects with a supply conduit 39, and which conduit is connected with a fan or compressor capable of producing an adequate volume of air at a pressure necessary to accomplish the desired results, which will be explained later in more detail.

The air conduit within the heating chamber is of progressively decreasing diameter in direction away from the end wall 8 and below said conduit between adjacent pairs of the batteries of burners (except the double burners 22) are horizontally elongated air discharge nozzles 40. A pair of such nozzles is between wall 8 and the first burner 23 nearest said wall, and a pair is between each of the adjacent pairs of batteries of burners 23 successively distant from wall 8 for about a third of the distance between walls 6, 8. Only one of such nozzles is between each of the next successive adjacent pairs of batteries of burners for approximately the next third of the distance between walls 6, 8 and there are no further air discharge nozzles for the remaining third of the distance. Each of these nozzles is connected by a vertical pipe 41 with conduit 36 that connects with each nozzle centrally between the ends of the latter.

The lower side of each nozzle 40 is formed with a slot extending the length of each nozzle, which slot is preferably ⅛" in width. The length of each nozzle is about the width of conveyor 3.

When air is delivered through the air conduit 36 to the nozzles, a generally vertical curtain of air will be discharged downwardly against the tomatoes from each nozzle. This air is preferably atmospheric air, and while some heating thereof will occur due to the position of the conduit 39 and the nozzles including pipes 41, the air is not heated to the temperature around the nozzles before discharge of such air into the heating chamber. Thus the air has a very desirable cooling function.

Any conventional valve means may be in conduit 39 to control the flow of air to the latter.

It will be seen from the foregoing that the double batteries of burners adjacent to the inlet 5 produces a higher and more uniform temperature in the chamber where the tomatoes enter the latter than the single batteries of burners, particularly when atmospheric air is injected into the heating chamber and against the tomatoes, as occurs between adjacent pairs of the burners during the last two-thirds of the travel of the tomatoes through the heating chamber.

By the time the tomatoes have reached the outlet 7, the entire skin from approximately eighty percent of the tomatoes will have been removed and of the remainder, most of the skin has been removed.

The tomatoes are discharged from the conveyor 3 onto a conveyor 43 after passing through outlet 7, and are carried below water spray nozzles 44 that wash the peeled tomatoes and that also cool the latter, although the pulp of the tomatoes is not cooked by the heat in the heating chamber. Any loose skin that may be laying on the tomatoes, or any loose solids are washed from the peeled tomatoes by the spray water.

By sorting the tomatoes to insure against the inclusion of partially green fruit or improperly cored fruit, eighty to ninety percent and more of the tomatoes are fully peeled by the present method and apparatus without mechanical or manual assistance, and the peeled tomatoes are firmer and of better appearance than heretofore where they have been peeled in the conventional ways.

The time for passage of the tomatoes through the steam box may be from approximately 20 seconds to 45 seconds, but it is preferably approximately 39 seconds. The steam in said steam box is at a temperature of approximately 200 to 210 degrees Fahrenheit. The temperature of the radiant heat at the surfaces of the tomatoes is approximately 1100° F. during the first third of their movement through the heating chamber although it may be as high as 1600° F., and approximately 700° F. during the second or central portion of their movement, and approximately 300° F. to 500° F. during the final third of said movement. These temperatures may vary 300 degrees up or down due to variations in the characteristics of the tomatoes, but it is not desirable that the skins be charred or reduced to carbon in order to remove them, since black specks of carbon may adhere to the tomatoes or be trapped in the core or crevices.

The distance between the air nozzles and the top of the belt carrying the tomatoes is preferably approximately 6 inches, and this may vary one way or the other approximately 1 to 2 inches according to the characteristics of the tomato.

The pressure of the air at the nozzles is about one lb. maximum through a discharge slot of about an eighth of an inch in width. The distance between the nozzles and the tomatoes is readily varied, as has been explained, but in any event the velocity and volume of air used may remain substantially constant. It should be noted, however, that the air is not heated except as may be incidental to its travel through the heating chamber to its time of impact against the tomatoes. The air in the conduit 39 may be at atmospheric temperature.

In operation, the skins of the tomatoes are heated by the steam in passing through the steam box, resulting in expansion of the skin relative to the pulp and consequent loosening of the skin on the pulp. The tomatoes, with the moisture from the condensation of steam on the skins, are then immediately moved (before cooling) into the hot zone of radiant heat where said moisture is evaporated, they are rotated to expose all sides to said radiant heat and are successively vibrated and gently impacted due to the recesses 17 on the rotary supports of conveyor 3 that are made up of the hexagon rods. This exposure to heat brings the temperature to a point where the moisture directly below the skins is vaporized to cause blisters to form, and which blisters will break under further expansion of the trapped vapors under the skin and the impacts received from the sides of recesses 17. At substantially this point in the path of travel of the tomatoes, the air striking the tomatoes alternately with the application of heat will not only cool the skins, but combined with the agitation of the tomatoes, will fully loosen and remove the skins, and a further cooling and removal of more obstinate skins occurs as the tomatoes pass below the water spray.

The above described alternate heating and cooling of th skins in combination with the previously described application of steam, which application of steam is for a much shorter period of time than where steam alone and manual removal of the skins is effected, is important in accomplishing the desired result of removing the skins without manual or mechanical assistance, and without forming charred material such as occurs in flame peeling or in peeling by radiant heat where no steam is applied.

The slots 18 in the supports on conveyor 3 permit passage of the air through the supports and any material that may pass through the spaces between the rods 15. Also the conveyor 3 is readily cleaned.

Side pieces 45 connected with tracks 9 hold conveyor 3 on the tracks 9 against lateral displacement therefrom.

It is to be understood that the detailed description hereinabove set out is not intended to be restrictive of the invention, but merely illustrative of a preferred form thereof.

We claim:

1. Apparatus for peeling tomatoes comprising: a heating compartment having an inlet at one end thereof and an outlet at the opposite end thereof, an endless, horizontally extending conveyor having its upper run extending across said compartment and through said inlet and said outlet, means connected with said conveyor for moving it at a uniform rate of speed through said conveyor from said inlet to said outlet, said conveyor being adapted to support a layer of tomatoes on said upper run for movement from said inlet to said outlet, a horizontally extending row of radiant heaters within said chamber spaced above said upper run and spaced longitudinally of said row and positioned for directing radiant heat against tomatoes adapted to be carried on said upper run, a row of air discharge nozzles within said compartment spaced above said upper run, each of said nozzles having a downwardly directed discharge opening formed therein extending substantially the width of said upper run in a direction transversely of the direction of travel thereof for directing air against tomatoes on said upper run, said air discharge nozzles being disposed between adjacent pairs of said heaters that are adjacent to said outlet whereby tomatoes adapted to be supported on said upper run will be alternately subjected to heat from heaters and from air from said blowers during movement of said tomatoes to said outlet, means connected with said nozzles for supplying relatively cool air thereto for discharge therefrom, means supporting said heaters for movement as a unit relative to said discharge nozzles in direction toward and away from said upper run and means connected with said heaters for so moving them whereby the effective cooling of said tomatoes adjacent to said outlet by air from said nozzles may be controlled according to the proximity of said heaters to the tomatoes on said upper run.

2. Apparatus for peeling tomatoes comprising; conveyor means extending generally horizontally adapted to support tomatoes thereon for continuous movement of said tomatoes in one general direction along a generally horizontally extending path of travel, steam applying means positioned along a portion of said path for applying steam to the skins of said tomatoes at a temperature of from approximately 200° F. to approximately 210° F. while said tomatoes are on said conveyor means and are moving along said path, conveyor actuating means connected with said conveyor means for actuating the latter to effect said movement of said tomatoes, radiant heating means along a portion of said path beyond said steam applying means in the direction of travel of said tomatoes and at points in said last mentioned portion spaced longitudinally of said path positioned over said conveyor means and adjacent thereto for applying radiant heat to the skins of the tomatoes while the latter are carried along said portion during actuation of said conveyor means, and cooling means positioned between said radiant heating means for blowing cooling air against said tomatoes between applications of radiant heat to said tomatoes by said radiant heating means.

References Cited in the file of this patent
UNITED STATES PATENTS

| | | |
|---|---|---|
| 1,222,008 | McIntyre | Apr. 10, 1917 |
| 1,243,724 | Fenn | Oct. 23, 1917 |
| 1,250,140 | Chapman | Dec. 18, 1917 |
| 1,670,225 | Zylstra | May 15, 1928 |
| 1,719,631 | Stott | July 2, 1929 |
| 1,916,269 | Kingsbury | July 4, 1933 |
| 1,921,055 | Vucassovich | Aug. 18, 1933 |
| 1,992,398 | Ryder | Feb. 26, 1935 |
| 2,218,466 | Gray et al. | Oct. 15, 1940 |
| 2,638,137 | De Back | May 12, 1953 |
| 2,776,690 | Warren | Jan. 8, 1957 |
| 2,835,295 | Magnuson | May 20, 1958 |

OTHER REFERENCES

"Peeling by Hot Air-Blast," Food Engineering, February 1955, pages 68–69.